Sept. 2, 1952 G. E. BERGGREN 2,608,718
APPARATUS FOR CONTINUOUSLY MAKING VULCANIZED ARTICLES
Filed March 30, 1948 2 SHEETS—SHEET 1

INVENTOR
G.E. BERGGREN
BY
ATTORNEY

Patented Sept. 2, 1952

2,608,718

UNITED STATES PATENT OFFICE 2,608,718

APPARATUS FOR CONTINUOUSLY MAKING VULCANIZED ARTICLES

George E. Berggren, Baltimore, Md., assignor to Western Electric Company, Incorporated, New York, N. Y., a corporation of New York Application March 30, 1948, Serial No. 17,916

4 Claims. (Cl. 18—6)

This invention relates to apparatus for continuously making vulcanized articles, and more particularly to apparatus for cooling continuous lengths of vulcanized articles emerging from vulcanizing tubes having steam under a high pressure therein and for sealing the steam in the vulcanizing tubes from the atmosphere.

An object of the invention is to provide new and improved apparatus for continuously making vulcanized articles.

A second object of the invention is the provision of new and improved apparatus for cooling continuous lengths of vulcanized articles emerging from vulcanizing tubes having steam under a high pressure therein and for sealing the steam in the vulcanizing tubes from the atmosphere.

Another object of the invention is to provide new and improved apparatus for damping sudden surges of steam and water to smooth out the operation of pressure controlling devices associated with continuous vulcanization apparatus and cooling and sealing devices.

An apparatus illustrating certain features of the invention may include a vulcanizing tube, a cooling and sealing tube connected to one end of the vulcanizing tube, means for supplying steam under high pressure into the vulcanizing tube, means for supplying water under high pressure into the cooling and sealing tube, and a baffled tube positioned between the vulcanizing tube and the cooling and sealing tube for restricting flow of the water or the steam from one of these tubes to the other.

Figure 1:
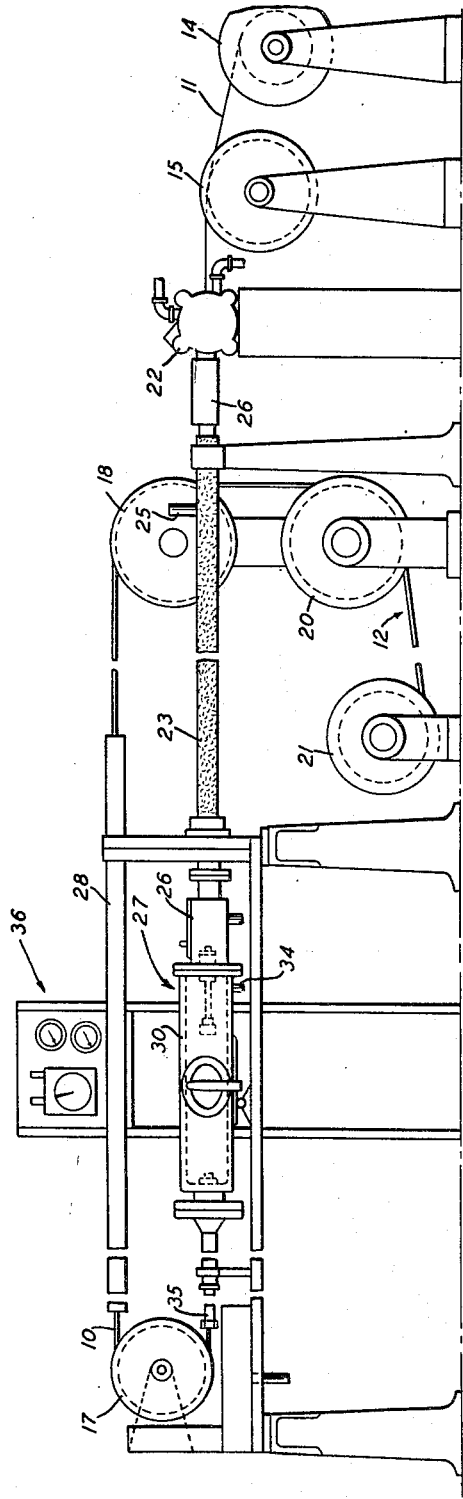
Figure 2:
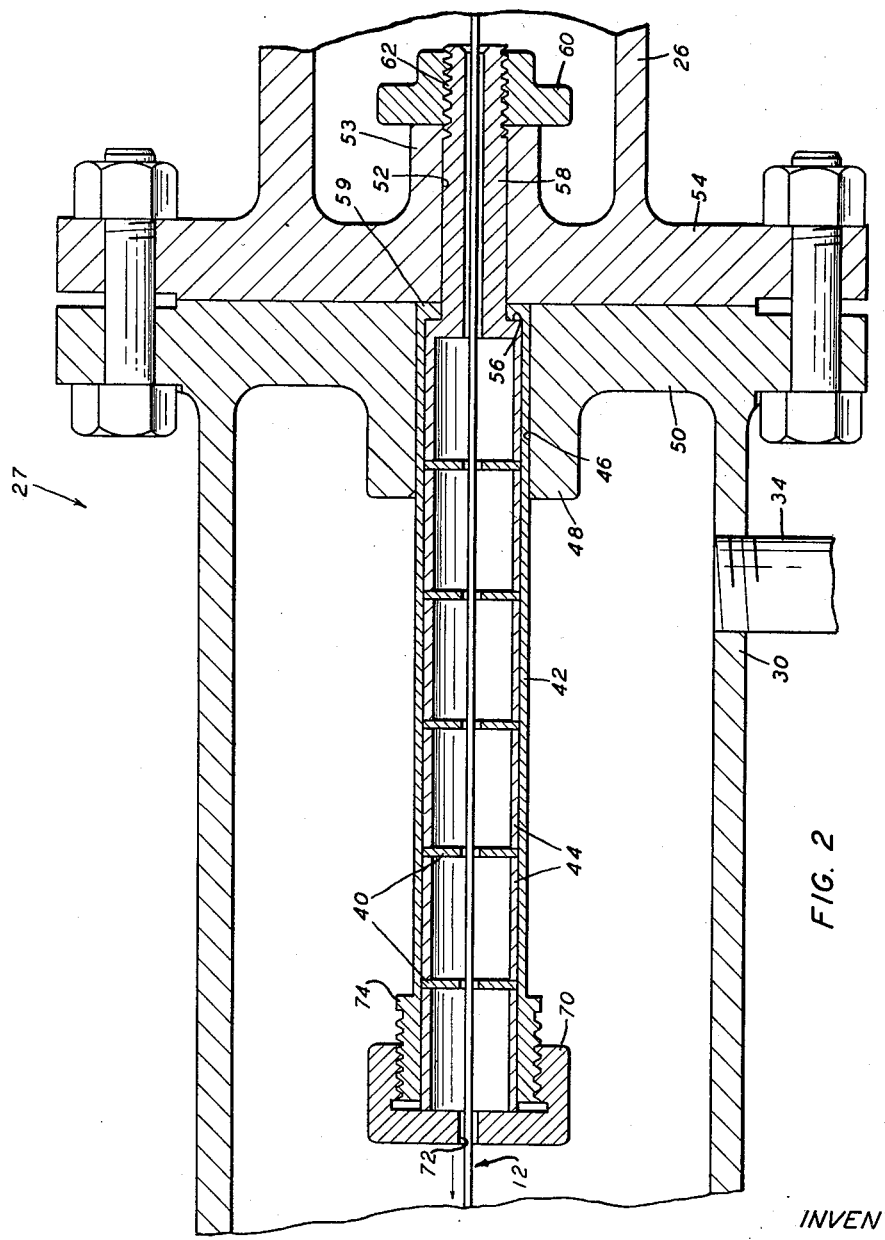

A complete understanding of the invention may be obtained from the following detailed description of an apparatus forming a specific embodiment thereof, when read in conjunction with the appended drawings, in which:

Fig. 1 is a fragmentary, side elevation of an apparatus illustrating certain features of the invention, and Fig. 2 is an enlarged, fragmentary, vertical section of a portion of the apparatus shown in Fig. 1.

Referring now in detail to the drawings, there is shown therein a continuous extruding and vulcanizing machine for forming and vulcanizing a protective covering 10 (Fig. 1) over a filamentary core 11 to form a filamentary article 12. In forming the covering upon the core 11, the core is advanced continuously from a supply reel 14 at a high rate of speed by a supply capstan 15, and is advanced continuously by a take-up capstan 20 from the supply capstan 15 around sheaves 17 and 18 to a takeup reel 21. As the core 11 is drawn from the supply capstan 15, it passes through an extruder 22, which extrudes thereover the covering 10 composed of a vulcanizable compound.

The resulting filamentary article 12 passes from the extruder 22 into an elongated vulcanizing tube 23, which has steam under a high pressure supplied thereto by a steam pipe 25, whereby the covering of insulating compound is vulcanized as it is advanced through the vulcanizing tube. The article 12 passes from the vulcanizing tube into and through a splice box 26 and a cooling and sealing unit 27, wherein the covering 10 is cooled and maintained under pressure by cold water under a pressure substantially equal to that of the steam. The article 12 is advanced from the unit 27 by the capstan 20 around the return sheave 17, into a cooling trough 28, to which cold water is supplied, and around the sheave 18 to the takeup reel 21.

The cooling and sealing unit 27 includes an elongated cooling tube 30 into which cooling water is introduced at a high pressure through a supply pipe 34. A baffled seal 35 restricts flow of water from the tube 30. The pressure of the steam supplied to the vulcanizing tube 23 by the pipe 25 and that of the water introduced by the pipe 34 normally are maintained substantially equal by a differential pressure controlling apparatus 36, which may be similar to that disclosed in copending application Serial No. 702,601, filed October 11, 1946, by A. Stiegler for "Continuous Vulcanizing Apparatus," now Patent 2,540,497, issued February 6, 1951. However, such pressure controlling apparatus by itself is not effective to balance the pressures immediately when there is a large surge or drop in the pressure of the steam.

A plurality of annular baffles 40—40 (Fig. 2) mounted in a tube 42 are spaced apart by cylindrical spacers 44—44 fitted into the tube 42. The tube 42 fits into a hole 46 formed in a boss 48 of a flanged end 50 of the tube 30, and is aligned with a hole 52 in a boss 53 of a flanged end 54 of the splice box 26. A shoulder 56 of a bushing 58 is drawn against an inner collar 59 fixed to the tube 42 by a nut 60 screwed on a threaded portion 62 of the bushing 58, which extends through the hole 52. The splice box 26 connects the tube 30 to the exit end of the vulcanizing tube 23. A cap 70 having a conductor passage 72 therein is mounted adjustably on a threaded collar 74 formed on the tube 42. The cap engages the left hand spacer 44, as viewed in Fig. 2, to lock the spacers 44—44 and the baffles 40—40 in place in the tube 42, which extends into the tube 30.

Operation

In the operation of the apparatus described hereinabove, the core 11 is advanced through the extruder 22 (Fig. 1), the vulcanizing tube 23 and the cooling and sealing unit 27 (Fig. 2). The steam introduced into the vulcanizing tube heats the covering 10 and vulcanizes it as it is continuously advanced therethrough. As the resulting filamentary article 12 is advanced through the unit 27, cold water under high pressure supplied to the unit 27 by the supply pipe 34 cools the covering 10 to toughen it, and the high pressure of the water on the covering prevents damage to the covering from any heated moisture enclosed within the covering. As the covering is cooled the moisture enclosed thereby is cooled, which reduces the pressure thereof.

When sudden surges in pressure of the steam or the water occur, the baffles 40—40 restrict the flow of steam into the cooling and sealing unit 27 or the flow of the water into the vulcanizing tube 23 sufficiently to prevent blowing out the water in the cooling and sealing unit or flooding the vulcanizing tube with water. The baffles 40—40 prevent transmission of surges in the steam or water pressures between the vulcanizing tube and the cooling and sealing unit so that the differential pressure controlling device has sufficient time to balance the pressures of the steam and water. Thus, hunting by the pressure controlling device is minimized. These baffles restrict the flow of water and steam so that only small quantities of either water or steam flow therethrough during such surges in pressure of the water or the steam. The openings in the baffles are small enough to restrict flow of water and steam, but are large enough to prevent contact between the covering 10 and the baffles so that abrasion of the covering is avoided.

What is claimed is:

1. An apparatus for continuously making vulcanized articles, which comprises a tube having an end plate, a cooling and sealing tube having an end plate, means for fastening said end plates together in face-to-face relationship, said end plates being provided with aligned passages therethrough forming a socket, a third tube, means for locking one end of the third tube in the socket, and a plurality of baffles positioned in the third tube for restricting the flow of fluids through the third tube, said baffles having aligned openings therethrough substantially larger in cross-section than a vulcanized article advanced therethrough so that scuffing of the article by the baffles is prevented.

2. An apparatus for continuously making vulcanized articles, which comprises a vulcanizing chamber wherein an article moving therethrough may be vulcanized under high pressure steam, a cooling and sealing chamber positioned in tandem with and adjacent to the vulcanizing chamber for holding cold water under a high pressure, a partition having a passage therethrough separating the chambers, a surge controlling tube smaller in diameter than the cooling and sealing chamber and secured to the partition in alignment with the passage therein so as to extend into the cooling and sealing chamber, a plurality of annular baffles positioned transversely in the tube, a plurality of hollow spacers positioned in the tube for spacing the baffles apart, a centrally apertured cap secured to the end of the tube for locking the baffles and the spacers in the tube, and a baffled seal at the exit end of the cooling and sealing chamber for gradually reducing the pressure of the water in said chamber to substantially atmospheric pressure.

3. An apparatus for continuously making vulcanized articles, which comprises a vulcanizing chamber, a cooling and sealing chamber positioned in tandem with the vulcanizing chamber, a partition having a passage therethrough positioned between the chambers, a tube, means for securing the tube to the partition in alignment with the passage, a plurality of annular baffles positioned in the tube, a plurality of hollow spacers positioned in the tube for spacing the baffles, a bushing having a threaded end portion and secured to one end of the tube and projecting therefrom through the passage in the partition, a nut for engaging the threaded end of the bushing to secure the tube to the partition and a cap having a passage therethrough for locking the baffles and the spacers in the tube.

4. An apparatus for continuously making vulcanized articles, which comprises a vulcanizing tube wherein a vulcanizable covering on a continuously moving conductor may be vulcanized under high pressure steam, an elongated cooling and sealing chamber for holding a large body of cold water under high pressure, means for connecting the cooling chamber to the exit end of the vulcanizing tube, a surge controlling tube connected to the entrance end of and projecting into the cooling chamber, a series of centrally apertured baffles positioned in the surge controlling tube for minimizing the effects of surges in the steam pressure and water pressure, and a baffled seal at the exit end of the cooling and sealing chamber for gradually reducing the pressure of the water in said chamber to substantially atmospheric pressure.

GEORGE E. BERGGREN.

REFERENCES CITED

The following references are of record in the file of this patent:

UNITED STATES PATENTS

| Number | Name | Date |
|---|---|---|
| 2,373,816 | De Roche et al. | Apr. 17, 1945 |
| 2,426,341 | Canfield | Aug. 26, 1947 |
| 2,446,620 | Swallow et al. | Aug. 10, 1948 |